United States Patent [19]
Hirai

[11] Patent Number: 5,037,287
[45] Date of Patent: Aug. 6, 1991

[54] PRESSURE MOLDING MEANS FOR POWDER

[76] Inventor: Akira Hirai, 3-19, 1-chome, Sakae-cho, Kawaguchi-shi, Saitama-Ken, Japan

[21] Appl. No.: 537,208

[22] Filed: Jun. 7, 1990

Related U.S. Application Data

[63] Continuation of Ser. No. 206,771, Jun. 15, 1988, abandoned.

[30] Foreign Application Priority Data

Jun. 15, 1987 [JP] Japan ............................... 62-148740

[51] Int. Cl.5 ........................ B30B 11/04; B29C 43/34

[52] U.S. Cl. .................................... 425/352; 264/109; 264/DIG. 36; 419/38; 425/78; 425/415; 425/422; 425/423

[58] Field of Search .................. 425/78, 292, 256-262, 425/352-355, 395, 406, 408, 415, 410, 412, 447, 441, 444, 344, 351, 422, 423, DIG. 35; 264/109-113, 122 DIG. 36; 29/569.1; 419/38, 39, 42; 100/239-242, 245, 246

[56] References Cited

U.S. PATENT DOCUMENTS

| | | | |
|---|---|---|---|
| 1,793,603 | 2/1931 | Frederick | 425/292 |
| 1,856,319 | 5/1932 | Cooper | 425/292 |
| 2,233,295 | 2/1941 | Miller | 425/292 |
| 3,020,589 | 2/1962 | Maritano | 425/423 |
| 3,183,570 | 5/1965 | Vogt | 425/260 |
| 3,564,654 | 2/1971 | Steingroever | 425/78 |
| 4,201,530 | 5/1980 | Vogt | 425/258 |
| 4,563,144 | 1/1986 | Rose | 425/256 |

FOREIGN PATENT DOCUMENTS

| | | | |
|---|---|---|---|
| 1042887 | 11/1958 | Fed. Rep. of Germany | 425/292 |
| 1284345 | 11/1968 | Fed. Rep. of Germany | 425/406 |
| 3029912 | 3/1982 | Fed. Rep. of Germany | 425/292 |
| 57-25911 | 2/1982 | Japan | 425/395 |
| 59-67006 | 4/1984 | Japan | 425/260 |
| 61-63422 | 4/1986 | Japan | 425/406 |
| 489584 | 1/1976 | U.S.S.R. | 264/122 |
| 1107753 | 3/1968 | United Kingdom | 425/292 |
| 1328960 | 9/1973 | United Kingdom | 425/352 |

*Primary Examiner*—Jeffery Thurlow
*Assistant Examiner*—Mathieu Vargot
*Attorney, Agent, or Firm*—William A. Drucker

[57] ABSTRACT

A pressure molding device having a powder supporting flat face formed by the end face of a pressure ram or a pressure-submissive block and a reciprocating vertical sleeve. The layer of powder formed on the flat face and having a uniform density is cut with the vertical sleeve's end for molding. A molded body has a uniform density in all portions and deformation does not occur in the course of sintering for producing semiconducting or insulating base boards.

5 Claims, 4 Drawing Sheets

PRESSURE MOLDING MEANS FOR POWDER

This application is a continuation of application Ser. No. 07/206,771, filed June 15, 1988, now abandoned.

TECHNICAL FIELD

This invention relates to molding means for powder of inorganic or organic substances under mechanical pressure. Also, this invention relates particularly to means for producing insulating or semiconducting base boards of sintered ceramics for the use for electronic parts and assemblies.

TECHNICAL BACKGROUND

Heretofore, it has required a complicated series of processes and various kinds of machines and devices for effecting such processes as to produce the aforementioned sintered base boards for electronic parts and assemblies. And, in such a series of processes, it has required a very long time and consumption of a large amount of energy for the treatment to secure desired characteristics in the products. And, moreover, very poor yield rates of products against raw powder materials could not be avoided.

As is well known, there are a dry method and wet method in the production of above-noted sintered base boards. According to said dry method, a binding agent is added in raw powder at a rate of 0.3 to 2% and granulated by a spray drying process or the like. Granules of powder thus obtained are sintered by heating at a high temperature and for a long time. A sintered block is then sliced into thin plates with a diamond cutter and such thin plates are ground finally to yield products.

And, according to the above-noted wet method, a binding agent is added in the raw powder at a high rate of 10 to 25% and kneaded in a mechanical kneader for about 50 hours so as to obtain a uniform phase of admixture. After the kneading operation, the admixture is submitted to heating for about 100 hours at a comparatively low temperature of about 300° C. so that evaporation of the binding agent may be completed. After this, the dry material is sintered for about 30 hours to obtain a sintered block. Then, the sintered block is sliced into thin plates and ground as stated above.

Thus, according to each one of the known methods as stated above, such base boards cannot be produced without effecting a complicated series of treatment which requires prudent operations and consumption of a large amount of energy, and without a long processing period. Moreover, according to such known methods, loss of raw powder amounts generally to over 50%. This loss is caused mainly in the course of slicing, cutting, and grinding operations which cannot be eliminated in such known methods.

On the other hand, it has been well known that solid ceramic plates of predetermined shape and size can be produced from ceramic powder by means of a known powder molding press such as a tabletting machine. However, upon such a solid ceramic plate being heated at a high temperature, it is necessarily highly deformed. So, such a ceramic plate which has been molded by means of a known powder molding press is not available for sintering treatment which is required for the production of the aforementioned base boards for electronic parts and assemblies. It is considered that the above-noted deformation of a molded ceramic plate is caused by lack of uniformity of density in the molded body, and such lack of uniformity of density is caused primarily by lack of uniformity of powder particles which have been fed into the mold recess.

This invention therefore is directed to provide pressure molding means by means of which, molded ceramic plates having a uniform density in all portions of the molded body can be obtained to overcome the foregoing drawbacks in the old methods for the production of such base boards for electronic parts and assemblies.

DESCRIPTION OF THE PREFERRED EMBODIMENTS

Figure 1:
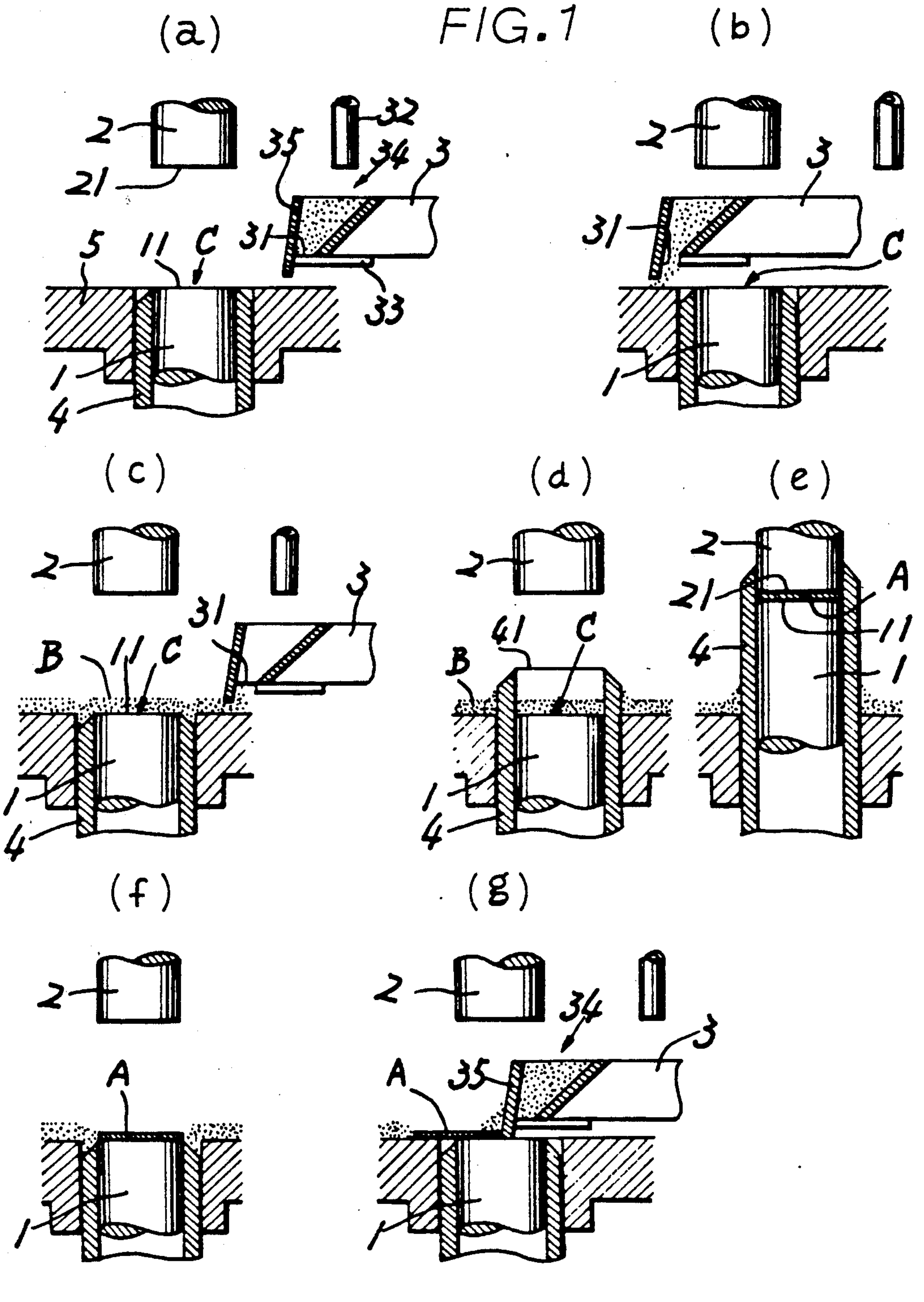
FIGS. 1(*a*) to 1(*g*) are diagrams of a series of processes for the production of a molded thin ceramic plate in which is used the first embodiment of this invention.

Hereunder will be stated this invention by reference to embodiments as shown in the drawings. A diagram indicated at (a) in each numbered title figure is shown in a mode of preparation of a molding press, and these diagrams (a) are referred to in the first place.

Numeral 1 is a pressure ram which is reciprocated vertically and its active face 11 has a shape and size corresponding to the plan figure of molded body A seen in diagrams (e), (f), and (g). It goes without saying that pressure ram 1 may be moved by hydraulic power means or by any suitable rotating motor through the medium of mechanical transmission means. Numeral 2 is a pressure-submissive block which has passive face 21 facing in a coaxial relation to active face 11 of pressure ram 1. Numeral 3 is a powder feeder which is provided with a feeding orifice 31 which can be advanced and retreated reciprocally and laterally at a constant velocity between said active face 11 and passive face 21. Feeding orifice 31 is required to be positioned at a distance apart from powder supporting face C which will be mentioned below. Numeral 4 is a vertical sleeve which is provided with an axial bore in a coaxial relation to active face 11 and passive face 21. Said axial bore has a cross section of shape and size equal to those of said faces 11 and 21. One of said faces 11 and 21 which is positioned lower than the other forms a powder supporting face C. Vertical sleeve 4 has means to be reciprocated vertically so that its end edge may pass the level of said powder supporting face C.

This invention comprises such a pressure ram 1, a pressure-submissive block 2, a powder feeder 3, and a vertical sleeve 4, as mentioned above.

However this invention is composed such as stated in the foregoing, the following matters which are shown for common parts in the embodiments of this invention shown in the drawings are not essential in this invention. In the first place, fixed table 5, the top face of which is set fixedly in a level of the aforementioned powder supporting face C is provided for the convenience of operation of the molding press, and a molding press which does not require a provision of such a fixed table 5 can be designed. Subsequently, in powder feeder 3, numeral 33 is a sliding shutter for orifice 31, and numeral 32 is a nozzle for dropping a predetermined quantity of powder into hopper 34 of powder feeder 3. However, as to the mechanism for feeding powder to feeding orifice 31, various known structures can be adopted. Also, in each embodiment of this invention as shown, the lower edge of front wall 35 of hopper 34 of powder feeder 3 serves as a scoop for discharging molded bodies, and it may be designed so that discharging means for molded bodies can be provided independently.

Figure 2:
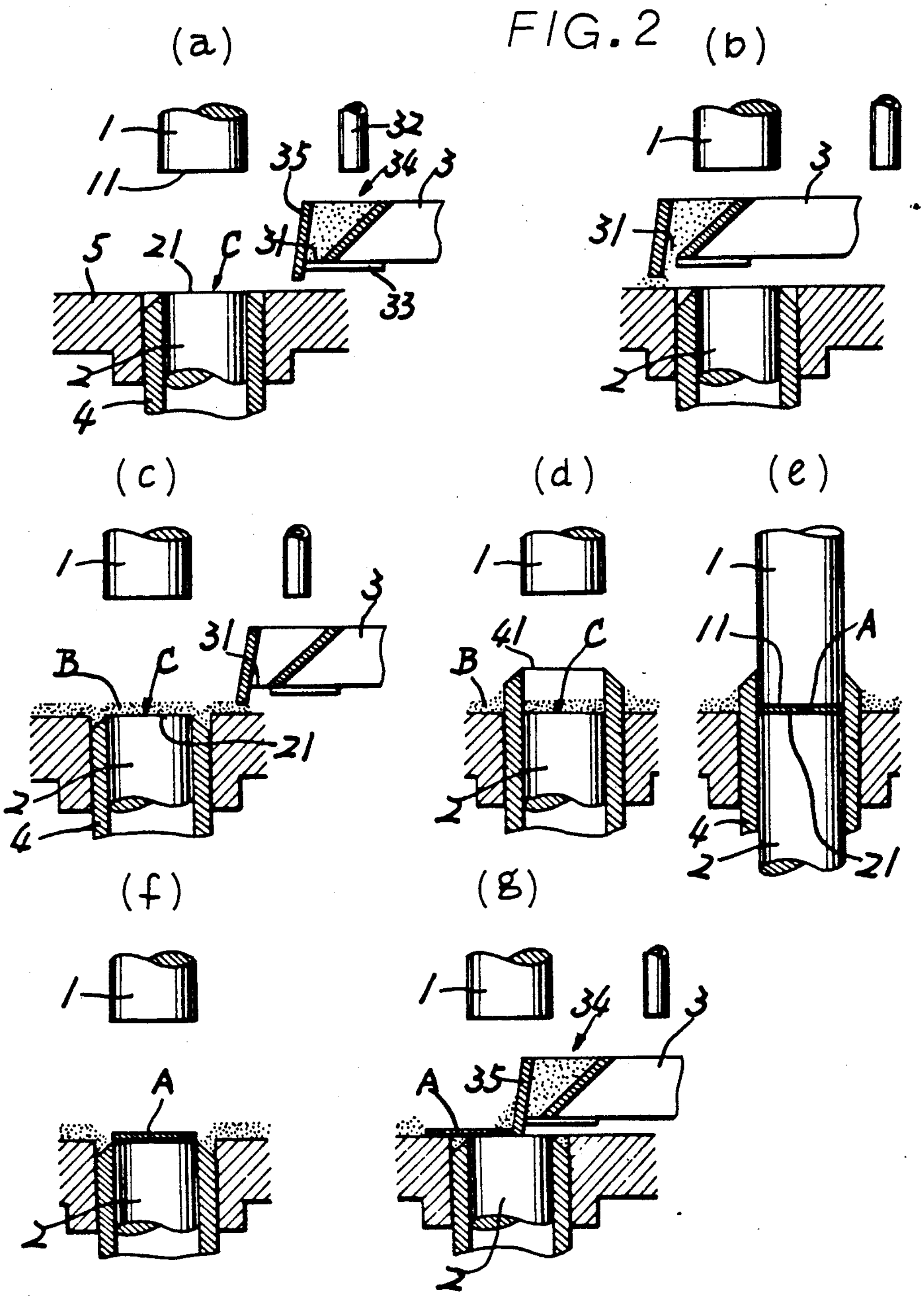
FIGS. 2(*a*) to 2(*g*) are diagrams similar to FIG. 1 in which is used the second embodiment of this invention.
Figure 3:
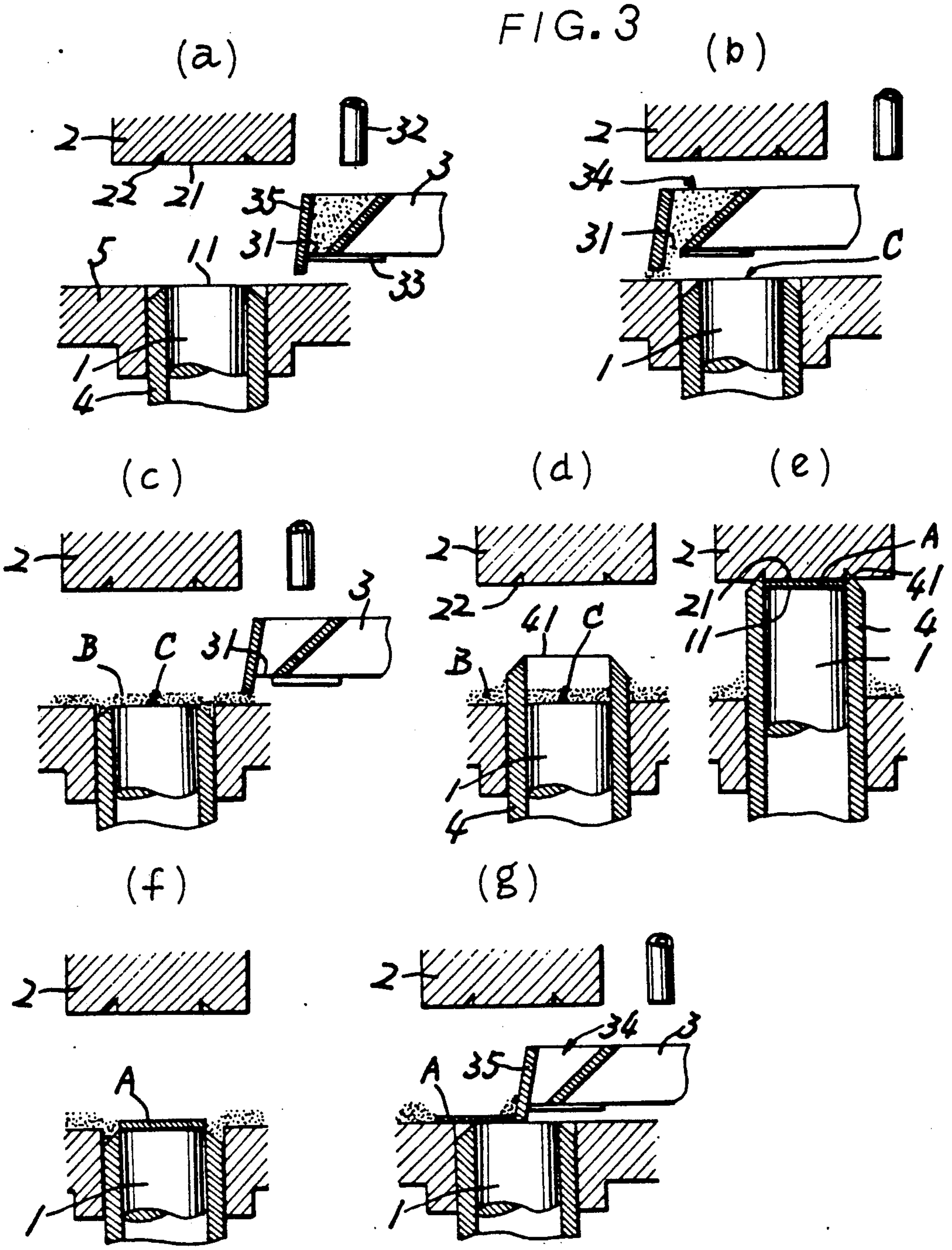
FIGS. 3(*a*) to 3(*g*) are diagrams similar to FIGS. 1 and 2, in which is used the third embodiment of this invention.
Figure 4:
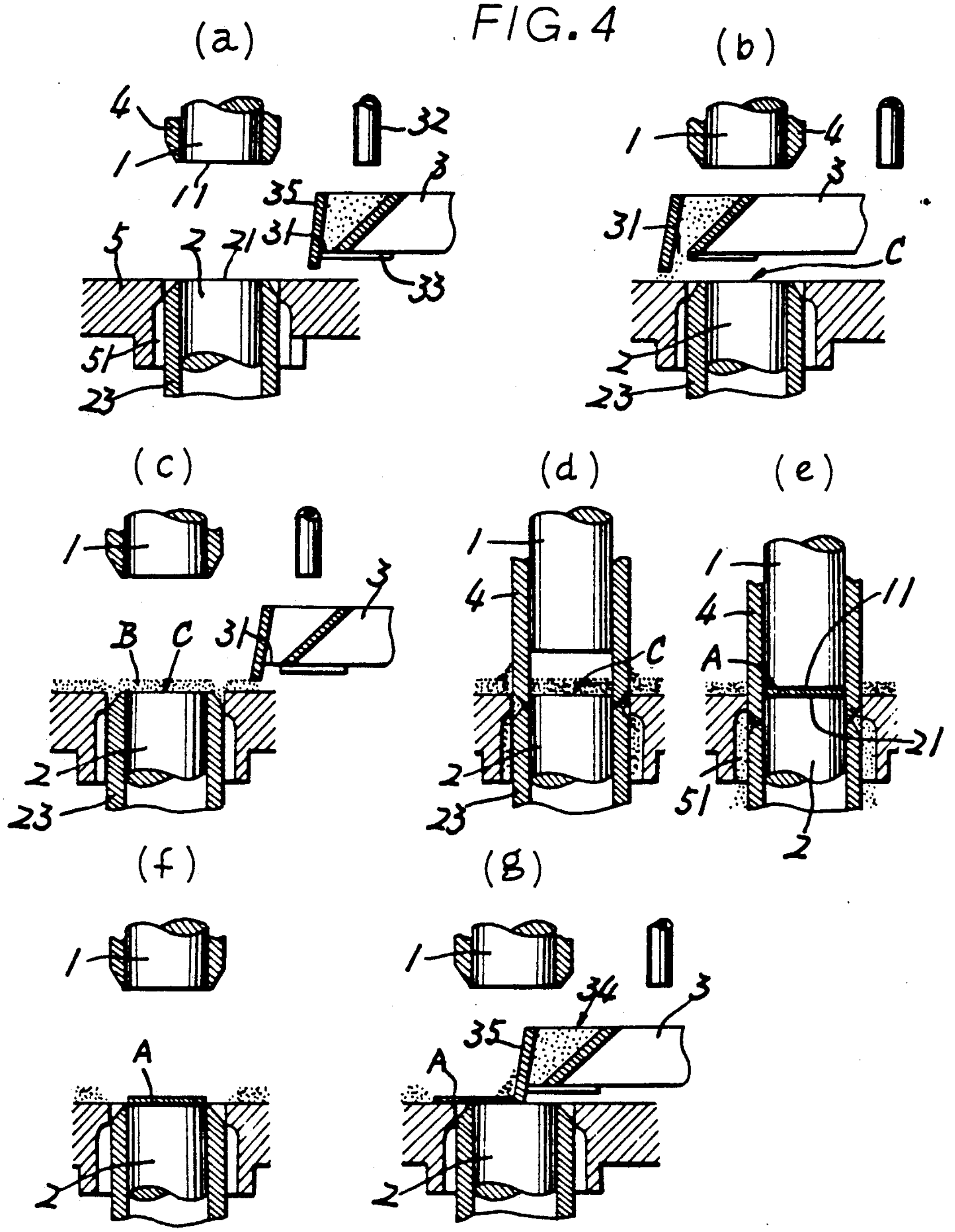
FIGS. 4(*a*) to 4(*g*) are diagrams similar to FIGS. 1, 2, and 3 in which is used the fourth embodiment of this invention.

Subsequently, matters particular to each embodiment will be stated hereunder. In the first place, as to relative vertical position of pressure ram 1 and pressure-submissive block 2, pressure ram 1 is positioned lower than pressure-submissive block 2 in the first embodiment shown in FIG. 1 and in the third embodiment shown in FIG. 3, and on the contrary, pressure ram 1 is positioned upper than pressure-submissive block 2 in the second embodiment shown in FIG. 2 and in the fourth embodiment shown in FIG. 4. And, in connection with this, it is noted particularly that, the aforementioned powder supporting face C corresponds to active face 11 of pressure ram 1 in the first and the third embodiments, and on the other hand, powder supporting face C corresponds to passive face 21 of pressure-submissive block 2 in the second and the fourth embodiments. And accordingly, vertical sleeve 4 in the first and the third embodiments is provided at the side of pressure ram 1, and the same is provided at the side of pressure-submissive block 2 in the second and fourth embodiments. In the third embodiment shown in FIG. 3 a groove 22 for receiving end edge 41 of vertical sleeve 4 is provided in the end face of pressure-submissive block 2 so as to prevent leakage of powder in the course of compression of fed powder B. And, in the fourth embodiment shown in FIG. 4, vertical sleeve 4 is provided around pressure ram 1 which is positioned above pressure-submissive block 2, and on the other hand, a follower sleeve 23 which has a shape similar to vertical sleeve 4 is provided around pressure-submissive block 2. This follower sleeve 23 is supported resiliently from below so that end edge 24 of the same may coincide with the level of powder supporting face C, and on the other hand, it may be pressed down by end edge 41 of vertical sleeve 4 such as shown in figure (d) or (e) of FIG. 1. Each one of end edges 41 and 24 of vertical sleeve 4 and follower sleeve 23 is not so sharp as an end edge 41 of vertical sleeve 4 in other embodiments and has a narrow but flat or rounded top face. Further, fixed table 5 in the fourth embodiment is provided with a groove 51 so that powder which is pushed down by vertical sleeve 4 may be discharged.

Now, as this invention is composed as stated in the foregoing, powder B is spreaded on powder supporting face C at the preparation mode of the molding press as shown in figure (a) in each of numbered title figures. As feeding orifice 31 of powder feeder 3 is advanced and retreated laterally between active face 11 of pressure ram 1 and passive face 21 of pressure-submissive block 2, and as one of said faces 11 and 21 forms aforementioned powder supporting face C, feeding orifice 31, at first, is advanced to a position beyond powder supporting face C. At this position of feeding orifice 31, spreading of powder is started such as shown in figure (b) and feeding orifice 31 is then retreated until it reaches its original position. And, as feeding orifice 31, smaller in cross sectional size than the powder supporting face, is kept above powder supporting face C at a distance apart therefrom and is moved at a constant velocity, powder B thus spreaded by feeding orifice 31 accumulates in a layer of a uniform thickness as shown in figure (c). Hereupon, as stated in the foregoing, powder supporting face C corresponds to active face 11 of pressure ram 1 in the first and the third embodiments, and said face C in the second and the fourth embodiments corresponds to passive face 21 of pressure-submissive block 2.

Subsequently, as shown in diagram (d) in each of numbered title figures, vertical sleeve 4 is moved so that end edge 41 of the same may pass the level of powder supporting face C as shown in diagram (d). That is, vertical sleeve 4 is moved in an upward stroke in the first and the third embodiments, and the same is moved in a downward stroke in the second and the fourth embodiments. As shape and size of the axial bore of vertical sleeve 4 are equal to the same of active face 11 of pressure ram 1 and the same of passive face 21 of pressure-submissive block 2 as stated in the foregoing, the aforementioned powder B in the outer areas of powder supporting face C is displaced by said movement of vertical sleeve 4.

Subsequently, upon pressure ram 1, in keeping a state in which end edge 41 of vertical sleeve 4 has been passed the level of powder supporting face C as shown in diagram (d), being moved toward pressure-submissive block 2, said layer of powder formed on powder supporting face C is compressed between the faces 11 and 12. Upon this, as the foregoing state, in which end edge 41 of vertical sleeve 4 has been passed the level of the aforementioned face C, is continuing, and as the powder in the course of being compressed can not leak out of the wall of vertical sleeve 4, the powder which is shut in by said faces 11 and 21 and the axial bore face of sleeve 4 is submitted to compression to form the objective molded body A.

Upon this, said ram 1 and sleeve 4 are moved vertically so as to recover their original positions as shown in diagrams (a) in each of numbered title figures. Then, molded body A will remain in a free state on said face C, so that it may be taken out for the product.

Further, according to each embodiment as shown, as front wall 35 of hopper 34 of powder feeder 3 is served also for a scoop for discharging molded bodies, powder feeder 3 is lowered in time of discharge so that the lower edge of front wall 35 may engage said face C. Then, upon powder feeder 3 being advanced, molded body A can be pushed off and discharged automatically.

UTILIZABILITY IN INDUSTRY

It is naturally possible to produce thin ceramic plates by means of a powder molding press heretofore known. However, on account of that, by means of a known powder molding press, it is almost impossible to feed powder into a mold recess in a uniform density throughout total area of said mold recess, a molded body having a uniform density throughout all portions in said molded body can never be obtained. But, by means of a molding press means according to this invention, it is quite easy that powder is spread in a uniform density throughout all the area on the aforementioned powder supporting face, because said powder supporting face has no barrier means such as a wall of mold recess around said face when the level of the same has not been passed by the end edge of the aforementioned vertical sleeve. And, no agitation is caused in the powder thus accumulated on said powder supporting face when the accumulated layer is cut by a cylindrical inner wall face of said sleeve. And, as the result, a molded body, obtained by compression by means of the aforementioned pressure ram and said pressure-submissive block, has a uniform density throughout all portions of the molded body.

And, on account of the uniformity of density, molded ceramic plates produced by means of a pressure molding means according to this invention, upon being sintered at a high temperature, sintered ceramic plates having predetermined shape and size can be produced without further working, such as cutting or grinding. So, according to this invention, ceramic plates such as semiconducting or insulating base boards for electronic parts and assemblies can easily and very economically be produced.

I claim:

1. Pressure molding means for powder comprising a fixed bed, a vertically reciprocated pressure ram having an active face of predetermined shape and size, a pressure submissive block having a passive face which faces against and in a coaxial relation with said active face and which has a shape and size equal to that of said active face, one of said active face and said passive face being positioned below the other and comprising a powder supporting face, means to move said active face and said passive face to compress therebetween powder fed on said powder supporting face, a vertical sleeve positioned in coaxial relation to said active face and said passive face and provided with a bore of a cross section of a shape and size equal to that of said active face, said vertical sleeve having an upper end edge which is level with said powder supporting face during a powder feeding operation and which, upon completion of said feeding operation, is moved upwardly through a powder layer spread on said supporting face to form, by means of the upper end portion of said vertical sleeve, a peripheral wall means for said supporting face, means to move said passive face slidably through said fixed bed, a powder feeder spaced from said powder supporting face, said powder feeder comprising a hopper carrying a predetermined amount of powder for one feeding operation and a feeding orifice of cross sectional size smaller than the cross sectional size of said powder supporting face, and means to reciprocate said powder feeder laterally at a constant velocity along a level between said active and said passive face to discharge and spread a layer of powder of predetermined thickness and uniform density on and across said powder supporting face.

2. Pressure molding means for powder as claimed in claim 1 in which, each of one of said pressure ram and said pressure-submissive block is a block having a uniform cross section so that the total area of the end face of each said block facing each other forms respectively said active face or said passive face, said pressure ram is positioned lower than said pressure-submissive block so that said powder supporting face is formed by said active face, and said vertical sleeve surrounds said pressure ram so that said axial bore of said vertical sleeve receives the end portion of said pressure-submissive block upon upward stroke of said vertical sleeve.

3. Pressure molding means for powder as claimed in claim 1 in which, each of one of said pressure ram and said pressure-submissive block is a block having a uniform cross section so that the total area of the end face of each said block facing each other forms respectively said active face or said passive face, said pressure-submissive block is positioned lower than said pressure ram so that said powder supporting face is formed by said passive face, and said vertical sleeve surrounds said pressure-submissive block so that said axial bore of said vertical sleeve may receive the end portion of said pressure ram upon downward stroke of said pressure ram.

4. Pressure molding means for powder as claimed in claim 1 in which, said pressure ram is a block having a cross section so that the whole area of the end face of said block forms said active face, said pressure-submissive block is a block having an end face of a size which is larger than said active face, the central portion of said end face of said submissive block forming said passive face, said pressure ram is positioned lower than said submissive block so that said powder supporting face is formed by said active face, and said vertical sleeve surrounds said pressure ram so that the end edge of said vertical sleeve engages said end face of said submissive block and so that the axial bore end coincides with said passive face upon upward stroke of said vertical sleeve.

5. Pressure molding means for powder comprising a pressure ram having an active face of a shape and a size which correspond to the plan figure of an objective molded body and being reciprocated vertically, a pressure-submissive block having a passive face which faces against and in a coaxial relation to said active face and which has a shape and a size equal to those of said active face, either one of said active face and said passive face which is positioned lower than the other serving as a powder supporting face, said active face and said passive face compressing therebetween powder fed on said powder supporting face, a vertical sleeve positioned in a coaxial relation to said active face and said passive face and provided with an axial bore of a cross section of a shape and a size equal to those of said active face and said passive face, and a powder feeder having a feeding orifice which, upon feeding operation of said powder feeder, is reciprocated laterally at a constant velocity along a level between said active face and said passive face and at a distance apart from said powder supporting face, said powder supporting face, upon feeding operation of said powder feeder, positioned free from any peripheral wall means for said powder supporting face, and said vertical sleeve reciprocated vertically so that the end edge of the same, upon completion of said feeding operation of said powder feeder, passes the level of said powder supporting face and crosses the powder layer formed thereon and so that the end portion of the same forms a peripheral wall means for said powder supporting face, each of one of said pressure ram and said submissive block being a block having uniform cross section so that the total area of the end face of each said block each facing to each other forms respectively said active face or said passive face, said pressure-submissive block positioned lower than said pressure ram so that said powder supporting face is formed by said passive face, said pressure-submissive block including a follower sleeve slideably positioned around said submissive block and supported resiliently from below so that the end edge of said follower sleeve keeps the level of said powder supporting face, said vertical sleeve surrounds said pressure ram so that the end edge of said vertical sleeve engages the end edge of said follower sleeve so that said follower sleeve is pushed and lowered by said vertical sleeve and the end portion of said pressure-submissive block is received in said axial bore of said vertical sleeve upon downward stroke of said vertical sleeve.

* * * * *